United States Patent
Goodwin

(10) Patent No.: US 10,031,328 B2
(45) Date of Patent: Jul. 24, 2018

(54) SYSTEMS AND METHODS FOR IMAGE PROCESSING IN OPTICAL MICROSCOPES

(71) Applicant: General Electric Company, Schenectady, NY (US)

(72) Inventor: Paul C. Goodwin, Issaquah, WA (US)

(73) Assignee: General Electric Company, Schenectady, NY (US)

(*) Notice: Subject to any disclaimer, the term of this patent is extended or adjusted under 35 U.S.C. 154(b) by 104 days.

(21) Appl. No.: 14/808,470

(22) Filed: Jul. 24, 2015

(65) Prior Publication Data

US 2017/0023786 A1   Jan. 26, 2017

(51) Int. Cl.
| | |
|---|---|
| *H04N 7/18* | (2006.01) |
| *H04N 9/47* | (2006.01) |
| *G02B 21/36* | (2006.01) |
| *G02B 21/00* | (2006.01) |
| *G06K 9/00* | (2006.01) |
| *G06T 5/00* | (2006.01) |
| *H04N 5/232* | (2006.01) |

(52) U.S. Cl.
CPC ......... *G02B 21/365* (2013.01); *G02B 21/008* (2013.01); *G02B 21/0076* (2013.01); *G06K 9/00134* (2013.01); *G06T 5/003* (2013.01); *H04N 5/23229* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 2,724,737 | A * | 11/1955 | Hogan | H04N 11/00 348/268 |
| 7,335,898 | B2 | 2/2008 | Donders et al. | |
| 2005/0085721 | A1* | 4/2005 | Fauver | G02B 21/002 600/425 |
| 2005/0123979 | A1* | 6/2005 | Weiss | B82Y 15/00 435/6.14 |
| 2013/0169595 | A1* | 7/2013 | Chang | G06K 9/00 345/175 |
| 2014/0267672 | A1* | 9/2014 | Morrison | G01N 21/6458 348/79 |

* cited by examiner

*Primary Examiner* — Heather Jones

(57) ABSTRACT

Example embodiments relate to systems and methods for processing an image in optical microscopy, such as for a CMOS camera used as an optical detector in a line confocal fluorescent imager. The method includes acquiring a raw image with a microscope, and asymmetrically deconvolving at least a portion of the raw image using a point-spread function that is different in an X-direction than in a Y-direction in order to generate an asymmetrically deconvolved image. When the image is a monochromatic fluorescence image, the method also includes compressing CMOS camera noise. Also provided is a system for processing an image in optical microscopy and an image processing system for processing a monochromatic image from a CMOS camera-based line-scan confocal fluorescent microscope.

22 Claims, 8 Drawing Sheets

SYSTEMS AND METHODS FOR IMAGE PROCESSING IN OPTICAL MICROSCOPES

TECHNICAL FIELD

Example embodiments disclosed herein generally relate to line scanning imaging systems. More specifically, example embodiments disclosed relate to systems and methods for processing images in a line confocal fluorescent microscope.

BACKGROUND

Generally, when researching tiny regions of interest on a sample, researchers often employ a fluorescence microscope to observe the sample. The microscope may be a conventional wide-field, structured light or confocal microscope. The optical configuration of such a microscope typically includes a light source, illumination optics, objective lens, sample holder, imaging optics and a detector. Light emitted from the light source illuminates the region of interest on the sample after propagating through the illumination optics and the objective lens. Microscope objective forms a magnified image of the object that can be observed via eyepiece, or in case of a digital microscope, the magnified image is captured by the detector and sent to a computer for live observation, data storage, and further analysis.

In wide-field microscopes, the target is imaged using a conventional wide-field strategy as in any standard microscope, and collecting the fluorescence emission. Generally, the fluorescent-stained or labeled sample is illuminated with excitation light of the appropriate wavelength(s) and the emission light is used to obtain the image; optical filters and/or dichroic mirrors are used to separate the excitation and emission light.

Confocal microscopes utilize specialized optical systems for imaging. In the simplest system, a laser operating at the excitation wavelength of the relevant fluorophore is focused to a point on the sample; simultaneously, the fluorescent emission from this illumination point is imaged onto a small-area detector. Any light emitted from all other areas of the sample is rejected by a small pinhole located in front to the detector which transmits on that light which originates from the illumination spot. The excitation spot and detector are scanned across the sample in a raster pattern to form a complete image. There are a variety of strategies to improve and optimize speed and throughput which are well known to those skilled in this area of art.

Line confocal microscopes are a modification of the confocal microscope, wherein the fluorescence excitation source is a laser beam; however, the beam is focused onto a narrow line on the sample, rather than a single point. The fluorescence emission is then imaged on the optical detector through the slit which acts as the spatial filter. Light emitted from any other areas of the sample remains out-of-focus and as a result is blocked by the slit. To form a two-dimensional image the line is scanned across the sample while simultaneously reading the line camera. This system can be expanded to use several lasers and several cameras simultaneously by using an appropriate optical arrangement.

One type of line confocal microscope is disclosed in U.S. Pat. No. 7,335,898, which is incorporated by reference, wherein the optical detector is a two dimensional sensor element operated in a rolling line shutter mode whereby the mechanical slit can be omitted and the overall system design may be simplified. It is apparent, however, that confocal microscopy offers a partial solution to imaging 3D structures but does so at a significant cost of the ability to image dynamic structures. Most cells, especially in eukaryotes, are never exposed to intense light and consequently are poorly adapted to successfully withstand high photon fluxes. Current solutions for providing for effective live-cell imaging and thick or complex biological structures are limited and expensive. Deconvolving wide-field images can be effective for live-cell imaging but are limited for thick or complex imaging. Confocal microscopy is effective for thick or complex imaging but is limited in live-cell imaging capability.

Existing systems provide for confocality in one-dimension (Y) while delivering wide-field performance in the orthogonal direction (X). This may have the advantage of producing significant enhancements to contrast in the image while delivering superior live-cell performance over conventional point-scan or multi-point confocal systems. However, existing systems can do so at the cost of optical quality. Since the existing systems provide confocality in one dimension only, the optics in other dimensions are elongated yielding unappealing images. Applying conventional deconvolution to these images can improve resolution and contrast but fails to improve the asymmetry (elongation) caused by the asymmetric optics.

SUMMARY

Example systems and methods disclosed apply an asymmetric deconvolution process to correct images acquired from a line confocal microscope. Such processing also provides an opportunity to introduce noise-regularization to enable imaging with even lower photon fluxes.

One example embodiment is a method for processing an image in optical microscopy. The method includes acquiring a raw image with a microscope, wherein the raw image may have an asymmetric resolution, and asymmetrically deconvolving at least a portion of the raw image using a point-spread function that is different in an X-direction than in a Y-direction in order to generate an asymmetrically deconvolved image. The method also includes displaying the asymmetrically deconvolved image on a display device. According to some example embodiments, the raw image may have an elliptical point spread function with a confocality in the Y-direction and a wide field in the X-direction. Asymmetrically deconvolving the raw image using the point-spread function may further include determining the point spread function based at least in part on the wide field point spread function in the X-direction, and applying the point spread function to the confocal point spread function in the Y-direction. Additionally or alternatively, asymmetrically deconvolving the raw image using the point-spread function may further include deconvolving the X-direction using the wide field point spread function, and deconvolving the Y-direction using the confocal point spread function. The confocal point spread function may be a square root of the wide field point spread function. A photon collection efficiency of the microscope can be at least 10%, or at least 25% of an equivalent wide-field microscope. The microscope can be a line-scan confocal microscope, live-cell confocal microscope, "spinning disk" microscope, fluorescent microscope, deconvolution microscope, or a point-scan confocal microscope. The raw image may be a monochromatic fluorescent image. According to some example embodiments, deconvolving the X-direction or Y-direction includes Baysian deconvolution, Richardson-Lucy deconvolution, Wiener deconvolution, Fourier deconvolution, wavelets, or other image processing methods that can compute deconvolution.

One example embodiment is a system for processing an image in optical microscopy. The system includes an input device configured to provide image data from a CMOS camera, and at least one processor coupled to the input device and configured to asymmetrically deconvolve at least a portion of the image data using a point-spread function that is different along an X axis than along a Y axis in order to generate an asymmetrically deconvolved image.

According to some example embodiments, the at least one processor includes at least one of a central processing unit, a graphics processing unit, and a floating point unit. The image data may include a monochromatic fluorescent image with an asymmetric resolution. The monochromatic fluorescent image may include an elliptical point spread function with a confocality in the Y axis and a wide field in the X axis. The at least one processor may be configured to determine the point spread function based at least in part on the wide field point spread function in the X axis, and apply the point spread function to the confocal point spread function in the Y axis. The at least one processor may further be configured to deconvolve the X axis using the wide field point spread function, and deconvolve the Y axis using the confocal point spread function. The confocal point spread function can be a square root of the wide field point spread function. The input device may include a line-scan confocal microscope, live-cell confocal microscope, "spinning disk" microscope, fluorescent microscope, deconvolution microscope, or a point-scan confocal microscope. A photon collection efficiency of the microscope may be at least 10%, or at least 25% of an equivalent wide-field microscope. According to one example embodiment, deconvolving the X or Y axis may include Baysian deconvolution, Richardson-Lucy deconvolution, Wiener deconvolution, Fourier deconvolution, wavelets, or other image processing methods that can compute deconvolution.

One example embodiment is an image processing system for processing a monochromatic image from a CMOS camera-based line-scan confocal fluorescent microscope. The system includes one or more CMOS cameras capable of generating the monochromatic image, and a system for processing the monochromatic image. The system includes an input device configured to provide image data from the CMOS camera, and at least one processor coupled to the input device and configured to asymmetrically deconvolve at least a portion of the monochromatic image using a point-spread function that is different in an X-direction than in a Y-direction in order to generate an asymmetrically deconvolved image.

Further scope of applicability of the present disclosure will become apparent from the detailed description given hereinafter. However, it should be understood that the detailed description and specific examples while indicating example embodiments are given by way of illustration only. Various changes and modifications within the spirit and scope of the disclosure will become apparent to those skilled in the art from the detailed description below.

The following description and the drawings sufficiently illustrate specific embodiments to enable those skilled in the art to practice them. Other embodiments may incorporate structural, process, and other changes. Portions and features of some embodiments may be included in, or substituted for, those of other embodiments. Details of one or more implementations are set forth in the accompanying drawings and in the description below. Further embodiments, features, and aspects will become apparent from the description, the drawings, and the claims. Embodiments set forth in the claims encompass all available equivalents of those claims.

DETAILED DESCRIPTION

Example embodiments are described with reference to the drawings, where like components are identified with the same numerals. The descriptions of these embodiments are exemplary and are not intended to limit the scope of the disclosure.

One example embodiment is a method for processing an image in optical microscopy. The method includes acquiring a raw image with a microscope, such as a line-scan confocal microscope. The raw image obtained from such a microscope may have an asymmetric resolution. The method includes asymmetrically deconvolving at least a portion of the raw image using a point-spread function that is different in an X-direction than in a Y-direction in order to generate an asymmetrically deconvolved image. The method also includes displaying the asymmetrically deconvolved image on a display device.

According to some example embodiments, the raw image may have an elliptical point spread function with a confocality in the Y-direction and a wide field in the X-direction. Asymmetrically deconvolving the raw image using the point-spread function may further include determining the point spread function based at least in part on the wide field point spread function in the X-direction, and applying the point spread function to the confocal point spread function in the Y-direction. Additionally or alternatively, asymmetrically deconvolving the raw image using the point-spread function may further include deconvolving the X-direction using the wide field point spread function, and deconvolving the Y-direction using the confocal point spread function. In some example embodiments, the confocal point spread function may be a square root of the wide field point spread function. According to some example embodiments, deconvolving the X-direction or Y-direction includes Baysian deconvolution, Richardson-Lucy deconvolution, Wiener deconvolution, Fourier deconvolution, wavelets, or other image processing methods that can compute deconvolution.

Figure 1:
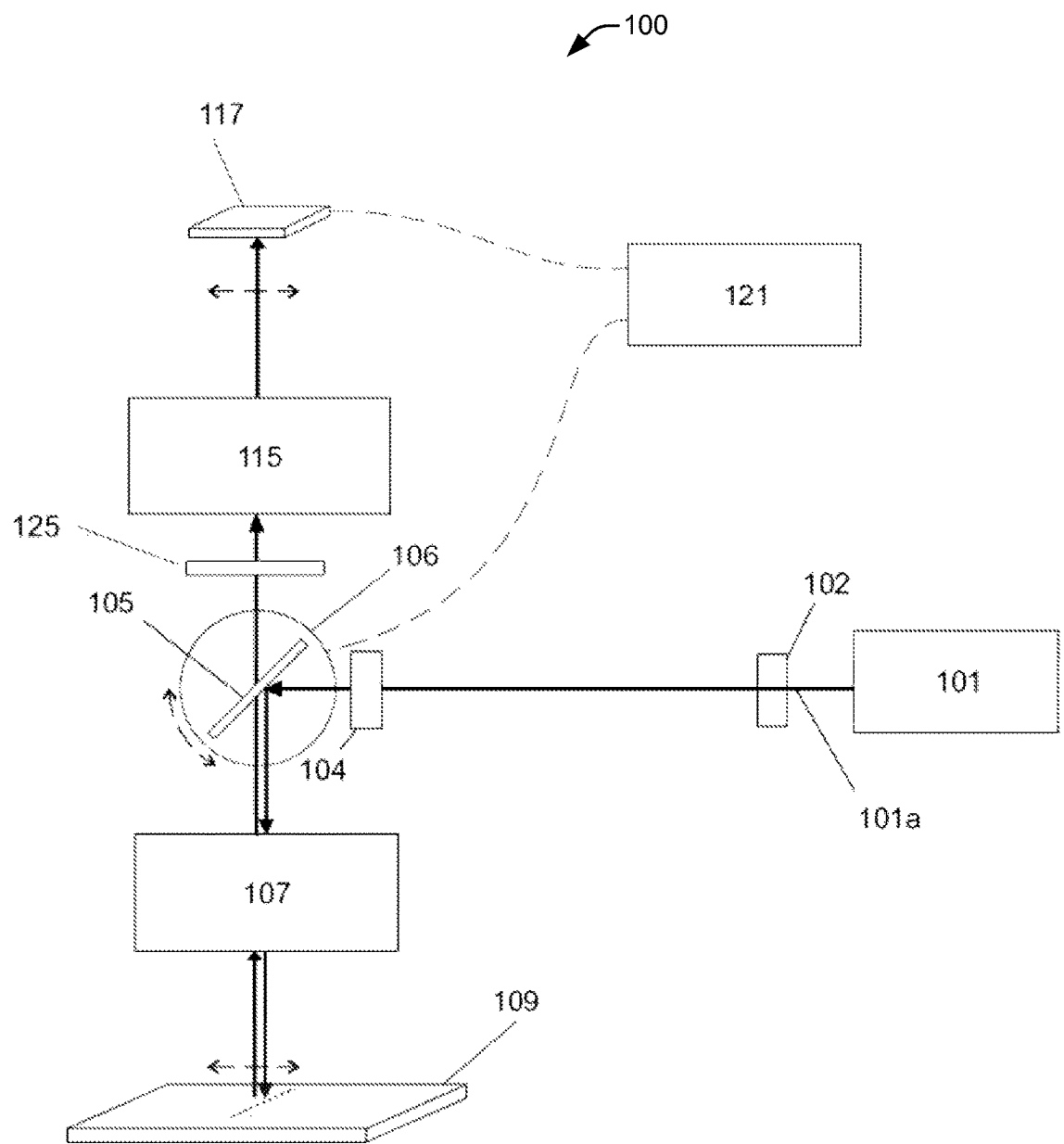
FIG. 1 is a block diagram of a line scanning imaging system that includes a rolling line shutter type detector in accordance with one or more example embodiments of the present disclosure.

FIG. 1 illustrates a block diagram of an example line scanning microscope system 100 from which the raw image may be obtained. The microscope system 100 may include a light source 101, a line forming unit 102, 104, scanning unit 105, objective lens 107, a sample 109, imaging optics 115, a two dimensional sensor unit 117, and a control unit 121. The system may contain other components as would ordinarily be found in confocal and wide field microscopes. The following sections describe these and other components in more detail. For a number of the components there are multiple potential embodiments. In general the example embodiment depends upon the target application.

The light source 101 can be any source capable of delivering light of the excitation wavelength to the target. According to one embodiment the light source 101 comprises one or more excitation lasers. In one embodiment it comprises 4+ lasers covering the optical spectrum from the near IR to the near UV. The light from each of these lasers can be coupled to the rest of the optical train by either delivering the light as a free space beam of the appropriate diameter, direction and degree of collimation or via fiber optic light delivery system. Alternatively, the light source may be a tuneable laser capable of being tuned to the appropriate excitation wavelengths. In a further example embodiment the light is delivered as a highly collimated beam with a specified beam diameter or via an optical fiber, for example, a single-mode polarization preserving fiber may be employed. In the embodiment comprising two or more lasers, the light source may comprise a laser selection module (not shown) for selecting the light of desired wavelength.

Light beam 101a is emitted by the light source 101 and formed to a line shaped beam by the line forming unit 102, 104. Example embodiments of the line-forming unit 102, 104 include, but are not limited to, a Powell lens (as described U.S. Pat. No. 4,826,299, incorporated herein by reference). The shape of the second conic-cylindrical surface is preferably specified to achieve both uniform illumination within 10% over the range $\Delta\theta$ and more than 80% transmission of the laser light through the objective 107. Alternative line forming units 102, 104 such as cylindrical lenses, diffraction gratings, and holographic elements can also be used.

The scanning unit 105 provides the scanning of the line shaped excitation light beam in the focal plane of the objective across the field of view of the microscope. According to one embodiment, the scanning unit 105 is a mechanically driven scanning mirror unit 105 that comprises a mirror that can be tilted about an axis transverse to the plane of FIG. 1. The angle of the tilt is set by an actuator 106. In the embodiment of FIG. 1, the scanning mirror unit 105 is configured to allow excited radiation from the sample 109 pass to the imaging optics 115 and the two dimensional detector unit 117 without significant distortion or attenuation. According to one embodiment, the mirror 105 is comprised of a narrow mirror centered on, or axially offset from, the rear of the objective 107, such that the major part of the excited light from the sample 109 pass at the side of the mirror 105.

According to another embodiment, the scanning mirror unit 105 comprises an optional dichroic mirror that is arranged to allow excited light from the sample 109 to pass. The design of the dichroic mirror will be such that the radiation of all wavelengths from the excitation light source are efficiently reflected, and that light in the wavelength range corresponding to fluorescence emission is efficiently transmitted. A multi band mirror based on Rugate technology is an example embodiment.

According to one embodiment the actuator 106 is a galvanometer with an integral sensor for detecting the angular position, such as a position encoder on the tilt axis to register the absolute position of the scanning mirror 105, but it may be comprised of another type of actuator capable of driving the scanning mirror. According to one embodiment, the actuation of the actuator 106 can be controlled such that the scanning trajectory of the scanning mirror 105 is controllable. As will be disclosed in more detail below, the actuator and thus the scanning trajectory of the scanning mirror 105 is controlled by the control unit 121 or the like.

The scanning unit 105 is arranged to direct the light beam 101a on the back aperture of the objective 107 and to scan the beam. In order to view the sample in different magnifications, the microscope may comprise two or more objectives 107 of different magnification, e.g. 10× and 20× or the like. The light emitted or reflected from the sample 109 is collected by the objective lens 107, filtered by a filter unit 125, and then an image of the sample 109 is formed by the typical imaging optics 115 on the two dimensional sensor unit 117. The filter unit 125 is selected to let the excitation fluorescence wavelengths go through to the detector unit 117 and to block the excitation radiation wavelength(s).

The two dimensional sensor unit 117 is comprised of any suitable optical sensor array or camera capable of detecting the fluorescent light and generating an image, and that may be operated in a rolling line shutter mode. According to one embodiment, the two dimensional sensor unit 117 is a CMOS camera or a scientific CMOS (sCMOS) camera. The two dimensional sensor unit 117 is placed in a position optically conjugated to the imaging area on the sample and the shape and the size of the rolling line shutter detection area may be adjusted to be equal or smaller than an image of optically conjugated illumination line on the sample. The fluorescent emission that is delivered to the rolling line shutter detection area of the optical receiver is detected by reading the signals from the pixels located within the line shutter detection area of the sensor unit. The detection area of the sensor unit that is located outside of the rolling line shutter detection area of the sensor unit is disregarded during operation in rolling line shutter mode in order to reject optical signals received outside of the rolling line shutter detection area such as stray light and out of plane fluorescence. As the illumination area is scanned across the target/sample 109 using the scanning mirror unit, the rolling line shutter detection area of the sensor unit is moved in synchronization to maintain the optical conjugation with the illumination line on the sample.

As is schematically indicated in FIG. 1, the line scanning microscope system 100 comprises a control unit 121, which may be integrated, partly integrated or external to the microscope system 100. The control unit 121 may for example be a computer comprising necessary software to control the system 100 and to collect image data from the sensor unit 117. Control unit 121 may include one or more processors including but not limited to central processing units, graphical processing units, or floating point units. It may further comprise image processing capabilities to e.g. to enable subsequent analysis of the acquired images etc.

One main feature of the control unit 121 is to establish synchronization between the scanning unit 105 and the rolling line shutter operation of the sensor unit 117. The control unit 121 is arranged to control the scan trajectory for the scanning unit 105 with respect to rolling line shutter operation of the sensor unit 117, and vice versa, as well as the mutual timing. As mentioned above, according to one embodiment, the scanning trajectory of the scanning mirror 105 is controllable by controlling the actuation of the actuator 106 in accordance with a set of scan parameters defining the scanning trajectory, comprising scan origin, scan endpoint, scan velocity, scan acceleration rate, scan deceleration rate, etc. The rolling line shutter operation may be controlled in accordance with a set of shutter parameters defining the optical detection operation of the sensor unit, comprising line width, shutter velocity, shutter origin and endpoint etc.

In order to obtain high quality images, the rolling line shutter operated registration of the fluorescence signal resulting from the scan of the line shaped light beam across the field of view need to be synchronized. This synchronization can be broken into two categories: temporal sync and spatial sync. Temporal synchronization means that the velocity of the scanning line of the fluorescence signal resulting from the scanning is equal to the velocity of the rolling line shutter of the sensor unit 117 for any exposure time within an allowed range. Spatial synchronization means that the fluorescence signal resulting from the scanning during image acquisition is always located in the center of rolling line shutter detection area of the sensor unit 117. In order to achieve high quality imaging, both conditions of spatial and temporal synchronization shall be met during whole period of acquisition of a single image.

According to one embodiment, improved synchronization is achieved by setting the scanning trajectory to have an acceleration part outside the field of view of the sensor unit 117, thereby allowing the scanning unit 105 acceleration time and angle for scanning velocity stabilization. Due to the rolling line shutter mode of operation, the field of view of the sensor unit 117 is defined as the optically active area of the sensor unit 117 during one scan of the microscope system 10. In the situation where the optics allow scanning over the whole sensor unit 117, the optical active area may be equal to the full sensor unit area, but the optical active area may be restricted by the optics or by the scan and shutter parameters. According to one embodiment, the size of the optical active area is selectable and may thus be adjusted to a particular imaging situation or the like. In this way it is e.g. possible to image a selected portion of a sample in greater detail.

According to one embodiment, the control unit 121 comprises a low-level microprocessor for real-time control of the components of the microscope system 100, such as the scanning unit 105, the two dimensional detector unit 117, and light source 101. The scanning unit 105 is comprised of a scanning mirror arranged to be tilted about a scan axis by a digitally controlled actuator 106 such as a galvo unit. The digitally controlled actuator 106 has a position encoder on the tilt axis to register the absolute position of the scanning mirror 105 whereby the digital location of the tilt axis is always known. In order to provide real-time control of the synchronization, the digitally controlled actuator 106 and the two dimensional detector unit 117 are connected to the microprocessor control unit 121 by a high-speed digital connection. In this embodiment, the microprocessor control unit 121 is capable of instructing the digitally controlled actuator 106 where to go, whereby the digitally controlled actuator 106 quickly responds with the requested location. According to one embodiment, the high-speed digital connection is fast enough for the microprocessor control unit 121 to position the digitally controlled actuator 106 to scan the line shaped excitation light on a line-by-line basis during a scan, with respect to the subsequent lines of detection defined by the line shutter detection area of the two-dimensional sensor unit 117. As mentioned above, the microprocessor control unit 121 is arranged to initiate the rolling shutter operation of the two dimensional sensor unit 117 by providing a start signal. The two dimensional sensor unit 117 is in turn arranged to provide line-by-line control signals to the microprocessor control unit 121 that watches the line-by-line control signal from the two dimensional sensor unit 117 to keep track of the relative position of the line that is being digitized. According to one embodiment, the light source 101 is digitally controllable by the microprocessor control unit 121, whereby the microprocessor can turn on/off the light source 101 within the time it takes to scan one line.

Figure 2:
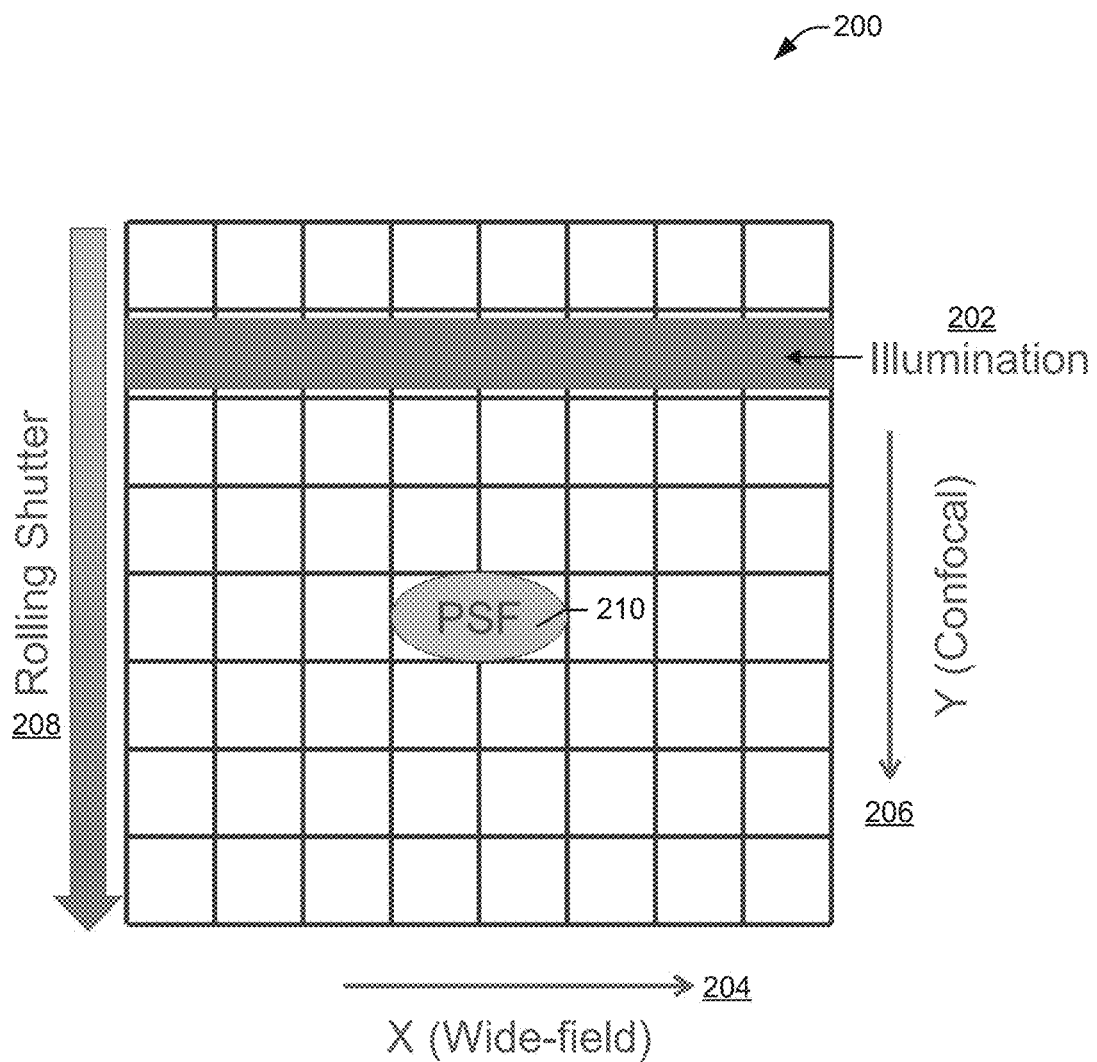
FIG. 2 is a schematic of a point spread function from a line-scan confocal microscope that includes a rolling line shutter type detector in accordance with one or more example embodiments of the present disclosure.

FIG. 2 is a schematic 200 of a point spread function 210 obtained from, for example, a line-scan confocal microscope as illustrated in FIG. 1. The point spread function (PSF) 210 may be described as the response of an imaging system to a point source or point object. The PSF 210 can be thought of as the extended blob in an image that represents an unresolved object. In functional terms it is the spatial domain version of the transfer function of the imaging system. The degree of spreading (blurring) of the point object is a measure for the quality of an imaging system. In non-coherent imaging systems such as fluorescent microscopes, telescopes or optical microscopes, the image of a complex object can be seen as a convolution of the true object and the PSF. However, when the detected light is coherent, image formation is linear in the complex field. In FIG. 2, PSF 210 may include a degree of confocality 206 in the Y-direction and a wide-field 204 in the X-direction. Light source or illumination 202 may line-scan the entire width along the Y-direction using the rolling shutter 208, similar to the rolling shutter described with reference to the above embodiment. Since the existing systems provide confocality in one dimension only, the optics in other dimensions are elongated yielding unappealing images. Applying conventional deconvolution to these images can improve resolution and contrast but fails to improve the asymmetry (elongation) caused by the asymmetric optics.

Figure 3:
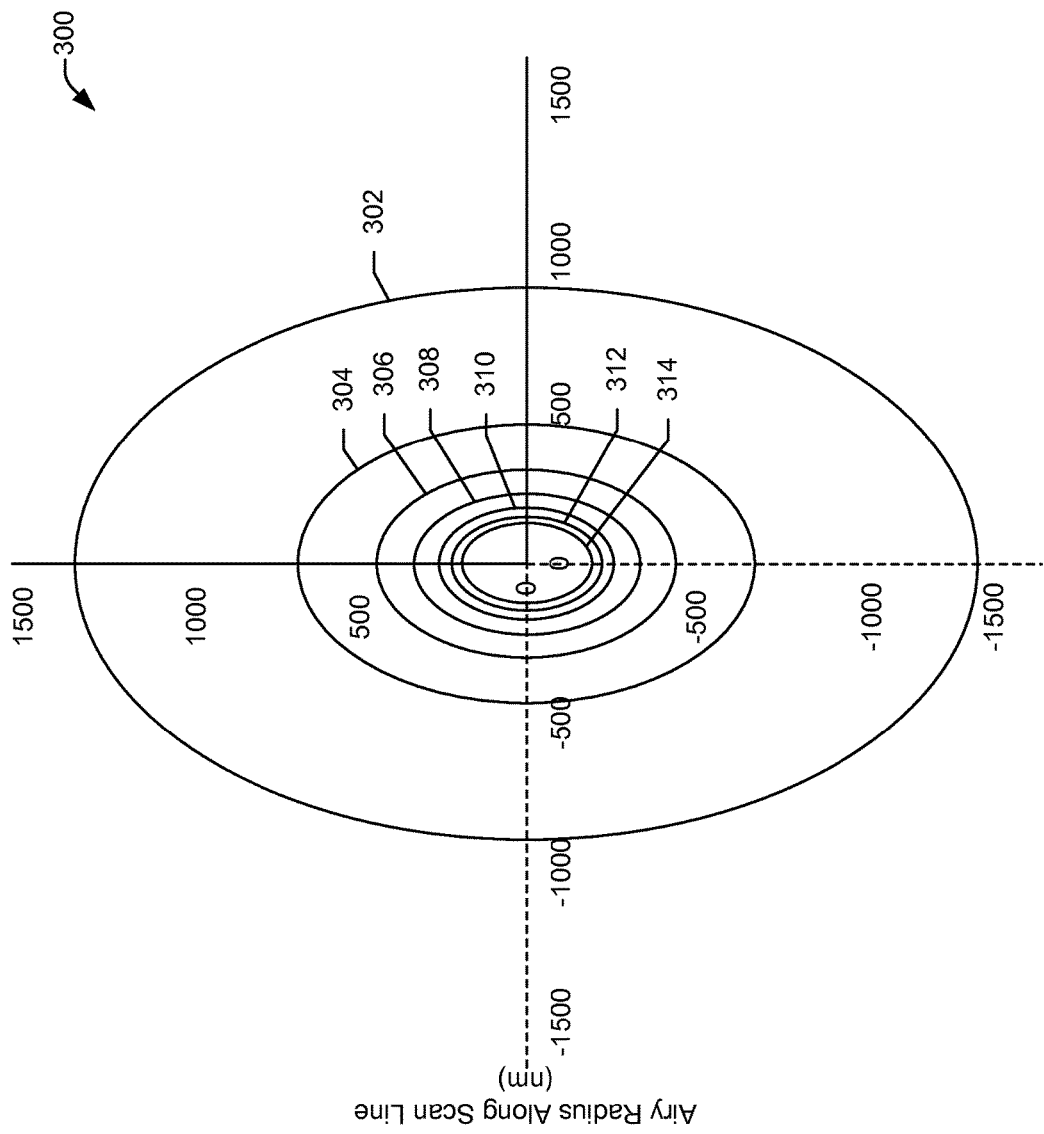
FIG. 3 is an example of an experimentally derived point spread function from a line-scan confocal microscope using different numerical apertures in accordance with one or more example embodiments of the present disclosure.

FIG. 3 is an example of theoretical point spread functions from a line-scan confocal microscope using different numerical apertures in accordance with one or more example embodiments of the present disclosure. The numerical aperture (NA) of an optical system is a dimensionless number that characterizes the range of angles over which the system can accept or emit light. By incorporating index of refraction in its definition, NA has the property that it is constant for a beam as it goes from one material to another provided there is no optical power at the interface. FIG. 3 illustrates an example model 300 of a line-scan confocal point spread function according to increasing numerical apertures of lenses in a microscope. Model 300 is a plot of the anticipated extent of the point spread function 210 illustrated in FIG. 2, for example. The X-axis in this case illustrates an Airy radius of the point spread function along the scan line, in nanometers, and the Y-axis, for example, illustrates an Airy radius of the point spread function orthogonal to the scan line, in nanometers. The inner most oval 314 illustrated in this figure is a point spread function according to a numerical aperture of 1.4. The next oval 312 is a point spread function according to a numerical aperture of 1.2. The next oval 310 is a point spread function according to a numerical aperture of 1.0. The next oval 308 is a point spread function according to a numerical aperture of 0.8. The next oval 306 is a point spread function according to a numerical aperture of 0.6. The next oval 304 is a point spread function according to a numerical aperture of 0.4. The outermost oval 302 illustrated in FIG. 3 is a point spread function according to a numerical aperture of 0.2. Thus it can be seen that as the numerical aperture of the lens increases, the asymmetry gets worse. So for higher resolution images, the asymmetry becomes a more significant contribution.

Figure 4:
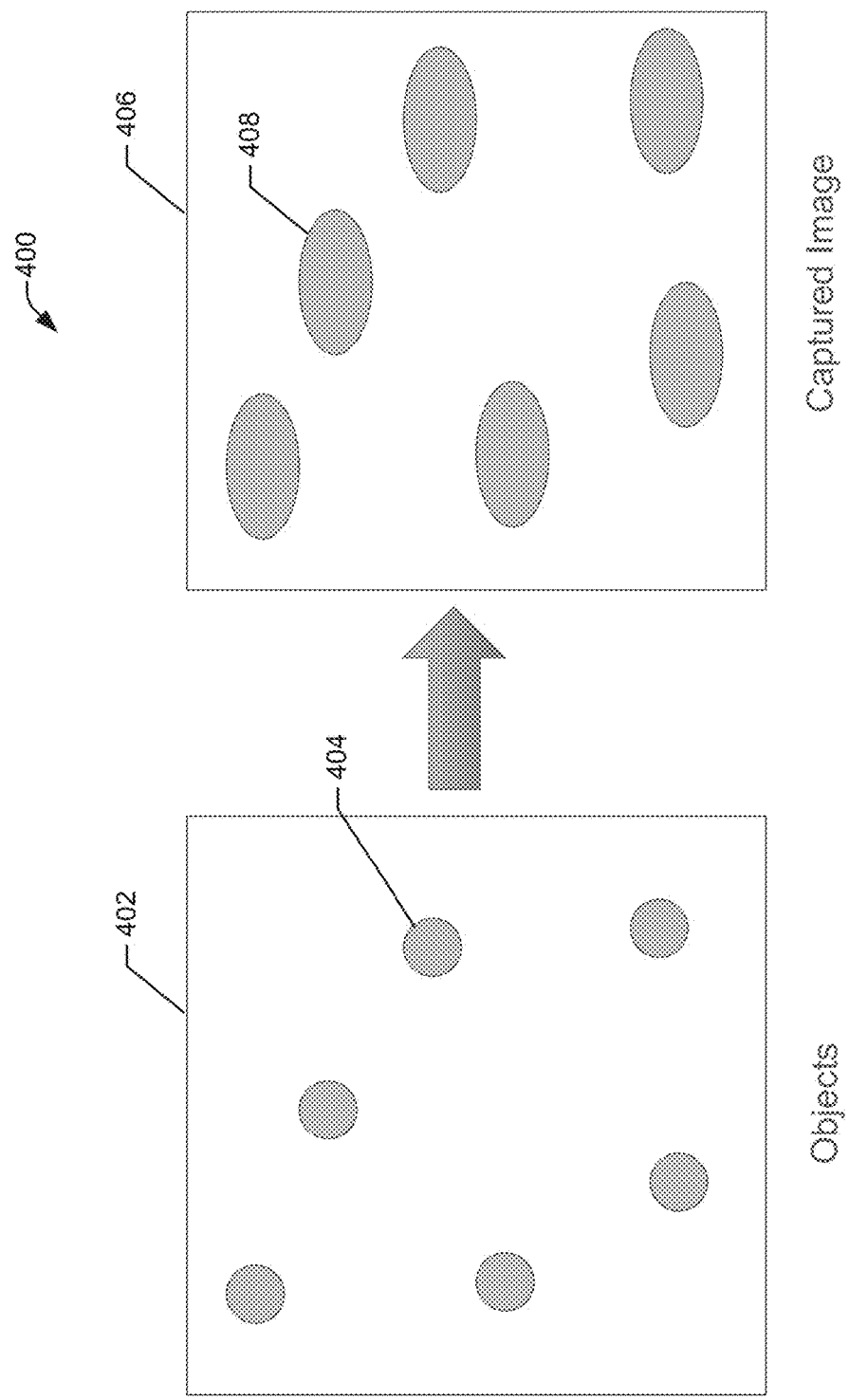
FIG. 4 illustrates an example of a monochromatic fluorescent image captured from a line-scan confocal microscope in accordance with one or more example embodiments of the present disclosure.

FIG. 4 illustrates an example of a monochromatic fluorescent image 400 captured from a line-scan confocal microscope in accordance with the example embodiment discussed in FIG. 1, for example. As illustrated, the field of view 402 of the one or more CMOS cameras may include one or more objects 404. These objects 404 may include dead or live-cells, which may be thick or thin, and have a dimension in x, y, and z directions. When these objects are captured in an image 406 using the microscope 100, however, the system induces confocality in one dimension only, and the optics in other dimensions are elongated as seen in captured objects 408, thus yielding unappealing images 406. In the Y dimension, the system may be confocal, which increases the resolution some but more importantly provides axial contrast. In the X dimension, the system may be a wide-field microscope. The consequence of this is that point objects appear elongated in the image.

Figure 5:
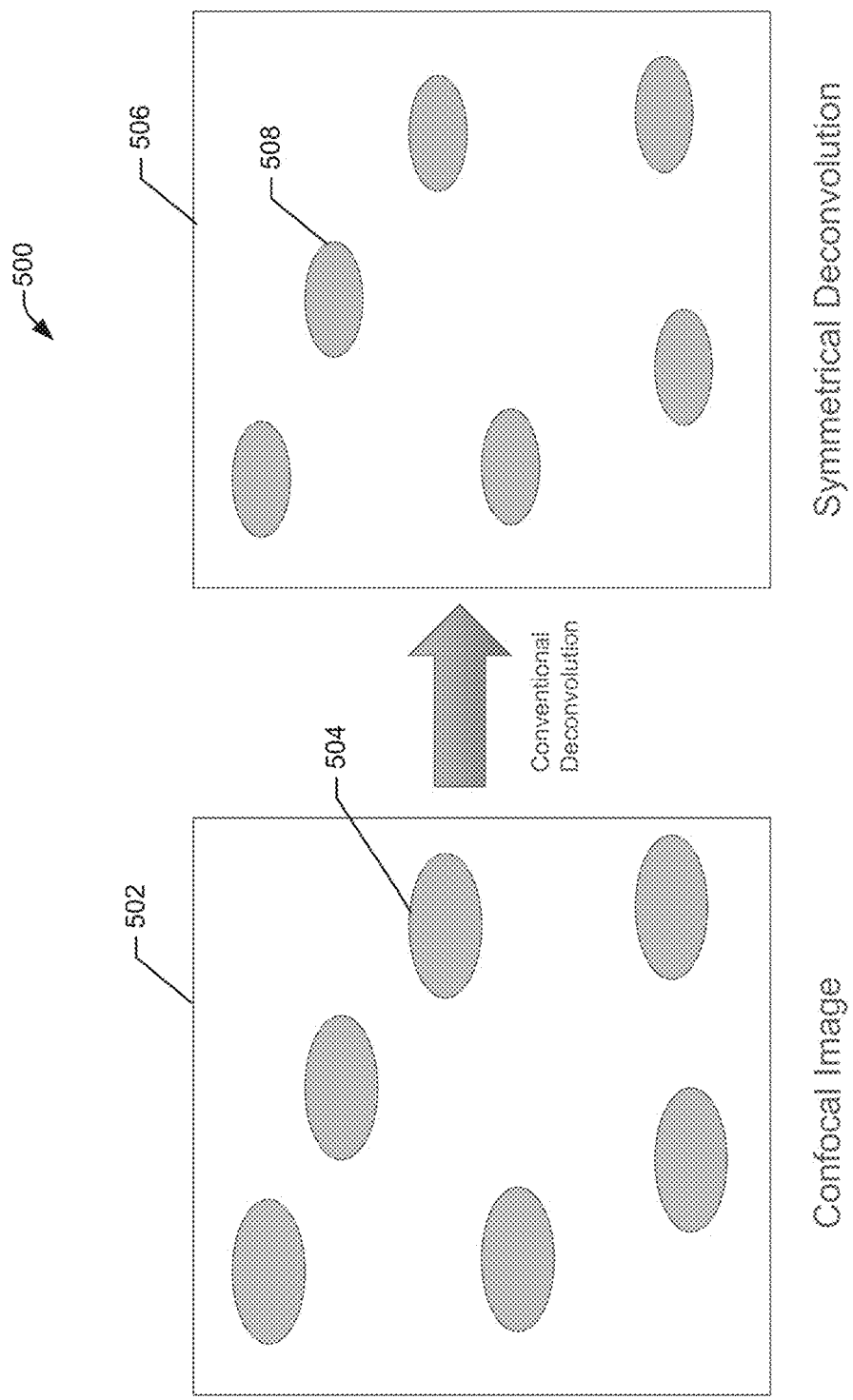
FIG. 5 illustrates an example method for processing an image in optical microscopy in accordance with the teachings of the prior art.

FIG. 5 illustrates an example method for processing the raw image 502 in accordance with the teachings of the prior art. Applying conventional deconvolution to these images, as illustrated, can improve resolution and contrast but fails to improve the asymmetry (elongation) caused by the asymmetric optics. More specifically, objects 504 which are captured as elongated shapes in the confocal image, remain elongated as illustrated in image 506 including objects 508 even after applying conventional symmetrical deconvolution. Conventional deconvolution assumes radial symmetry in the deconvolution process treating Y dimension and X dimension the same. This can increase contrast and resolution but in the case of an asymmetrical image, for example a line-scan confocal, the system does not correct for the asymmetry. Deconvolution may be defined as an algorithm-based process used to reverse the effects of convolution on recorded data.

Figure 6:
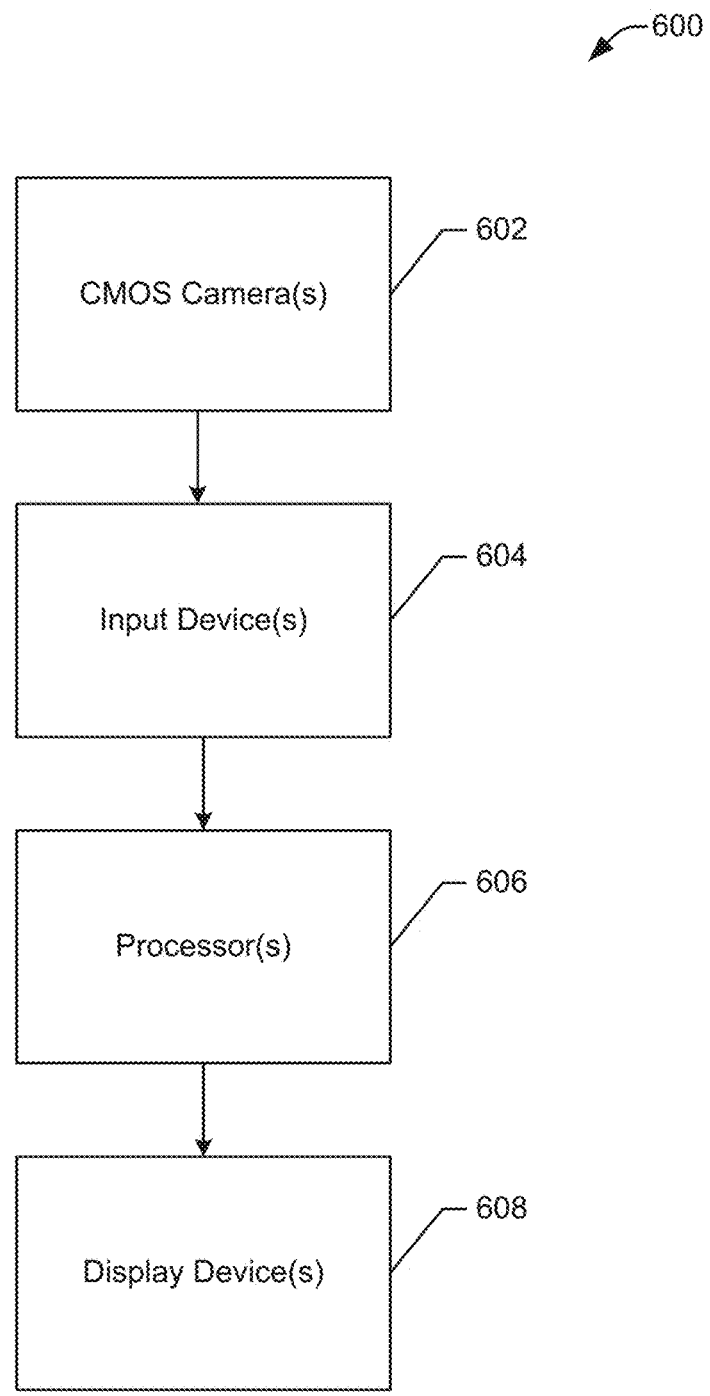
FIG. 6 illustrates an image processing system for processing a monochromatic image from a CMOS camera-based line-scan confocal fluorescent microscope in accordance with one or more example embodiments of the present disclosure.

FIG. 6 illustrates an image processing system 600 for processing a monochromatic image from a CMOS camera-based line-scan confocal fluorescent microscope in accordance with one or more example embodiments of the present disclosure. System 600 includes one or more CMOS cameras or sCMOS cameras 602, which may be similar to the CMOS cameras 117 described with reference to FIG. 1. System 600 also includes one or more input devices 604, which may be similar to the control unit 121 described with reference to FIG. 1. Input device 604 may for example be a computer comprising necessary software to control the system 600 and to collect image data from the sensor unit in CMOS camera 602. System 606 may also include one or more processors 606, which may be coupled to the input device 604 and configured to asymmetrically deconvolve at least a portion of the image data using a point-spread function that is different along an X axis than along a Y axis in order to generate an asymmetrically deconvolved image.

According to some example embodiments, the at least one processor 606 includes at least one of a central processing unit, a graphics processing unit, and a floating point unit. The image data may include a monochromatic fluorescent image with an asymmetric resolution. The monochromatic fluorescent image may include an elliptical point spread function with a confocality in the Y axis and a wide field in the X axis. The at least one processor 606 may be configured to determine the point spread function based at least in part on the wide field point spread function in the X axis, and apply the point spread function to the confocal point spread function in the Y axis. The at least one processor 606 may further be configured to deconvolve the X axis using the wide field point spread function, and deconvolve the Y axis using the confocal point spread function. The confocal point spread function can be a square root of the wide field point spread function, according to one example embodiment. The raw image can be obtained from a line-scan confocal microscope, live-cell confocal microscope, "spinning disk" microscope, fluorescent microscope, deconvolution microscope, or a point-scan confocal microscope. According to one example embodiment, deconvolving the X or Y axis may include Baysian deconvolution, Richardson-Lucy deconvolution, Wiener deconvolution, Fourier deconvolution, wavelets, or other image processing methods that can compute deconvolution. System 600 can also include one or more display devices 608 to display the asymmetrically deconvolved images or to further process or analyze the asymmetrically deconvolved images. Display device 608 may include one or more display technologies such as LCDs, LEDs, OLEDs, CRTs, or other known display technologies. Although input device 604 and processors 606 are illustrated as being two separate blocks, they may be incorporated into one single processor. The single processor may include a CPU or GPU, which may be core to the line-scan confocal microscope and may be configured for both signal acquisition and processing.

Figure 7:
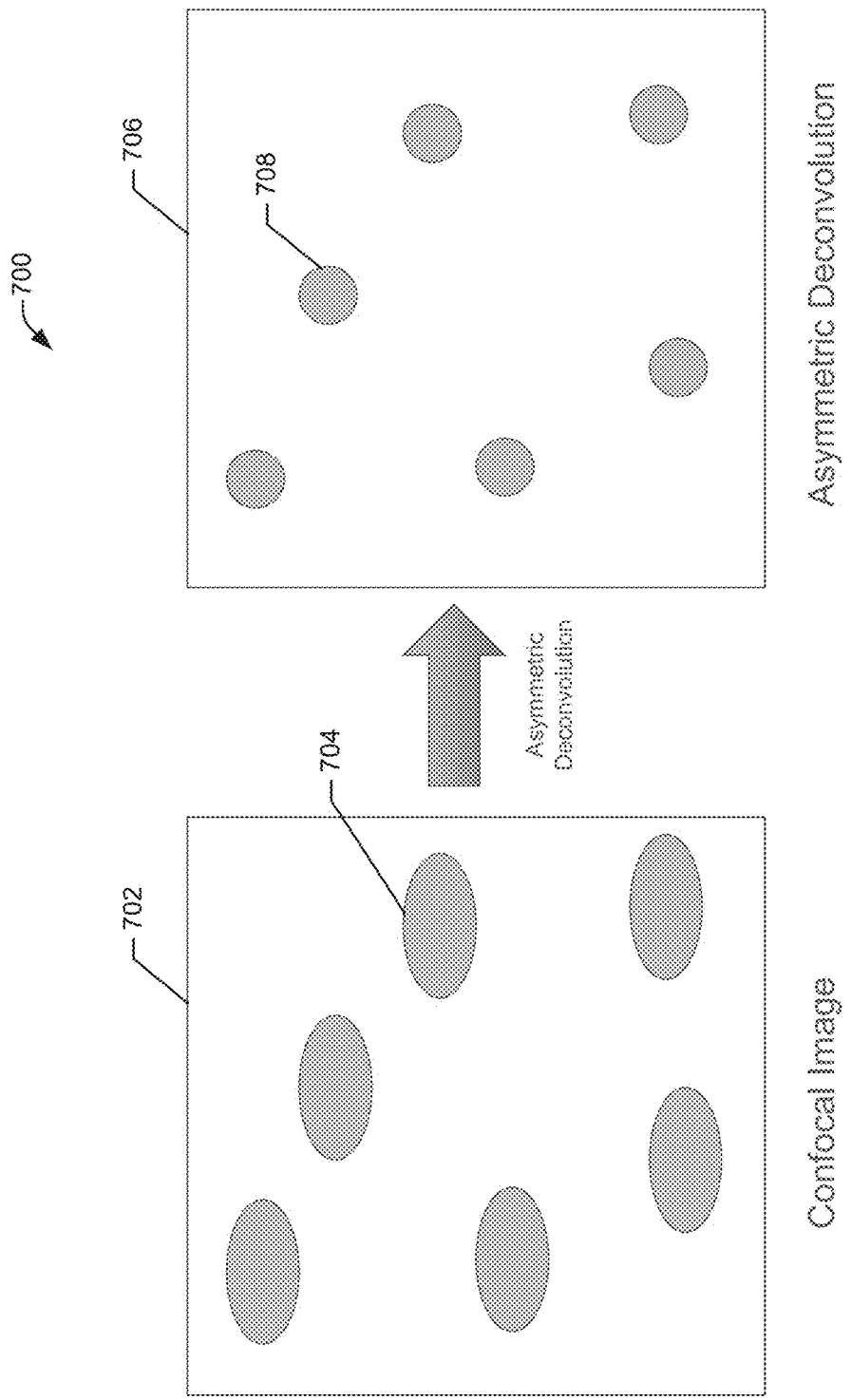
FIG. 7 illustrates an example method for processing a monochromatic image from a CMOS camera-based line-scan confocal fluorescent microscope in accordance with one or more example embodiments of the present disclosure.

FIG. 7 illustrates an example method 700 for processing a monochromatic image 702 from a CMOS camera-based line-scan confocal fluorescent microscope in accordance with one or more example embodiments of the present disclosure. Image 702 may be obtained from the input device 604 as illustrated in FIG. 6, for example. As illustrated, the acquired image 702 may include one or more objects 704, which when processed using asymmetric deconvolution, may result in an asymmetrically deconvolved image 706 including asymmetrically deconvolved objects 708. According to this example embodiment, at least a portion of image 702 may be asymmetrically deconvolved using a point-spread function that is different along an X axis than along a Y axis in order to generate an asymmetrically deconvolved image. The raw monochromatic fluorescent image may include an elliptical point spread function with a confocality in the Y axis and a wide field in the X axis. The method may include determining the point spread function based at least in part on the wide field point spread function in the X axis, and apply the point spread function to the confocal point spread function in the Y axis. The method may also include deconvolving the X axis using the wide field point spread function, and deconvolving the Y axis using the confocal point spread function. The confocal point spread function can be a square root of the wide field point spread function, according to one example embodiment. The raw image can be obtained from a line-scan confocal microscope, live-cell confocal microscope, "spinning disk" microscope, fluorescent microscope, deconvolution microscope, or a point-scan confocal microscope. According to one example embodiment, deconvolving the X or Y axis may include Baysian deconvolution, Richardson-Lucy deconvolution, Wiener deconvolution, Fourier deconvolution, wavelets, or other image processing methods that can compute deconvolution.

Figure 8:
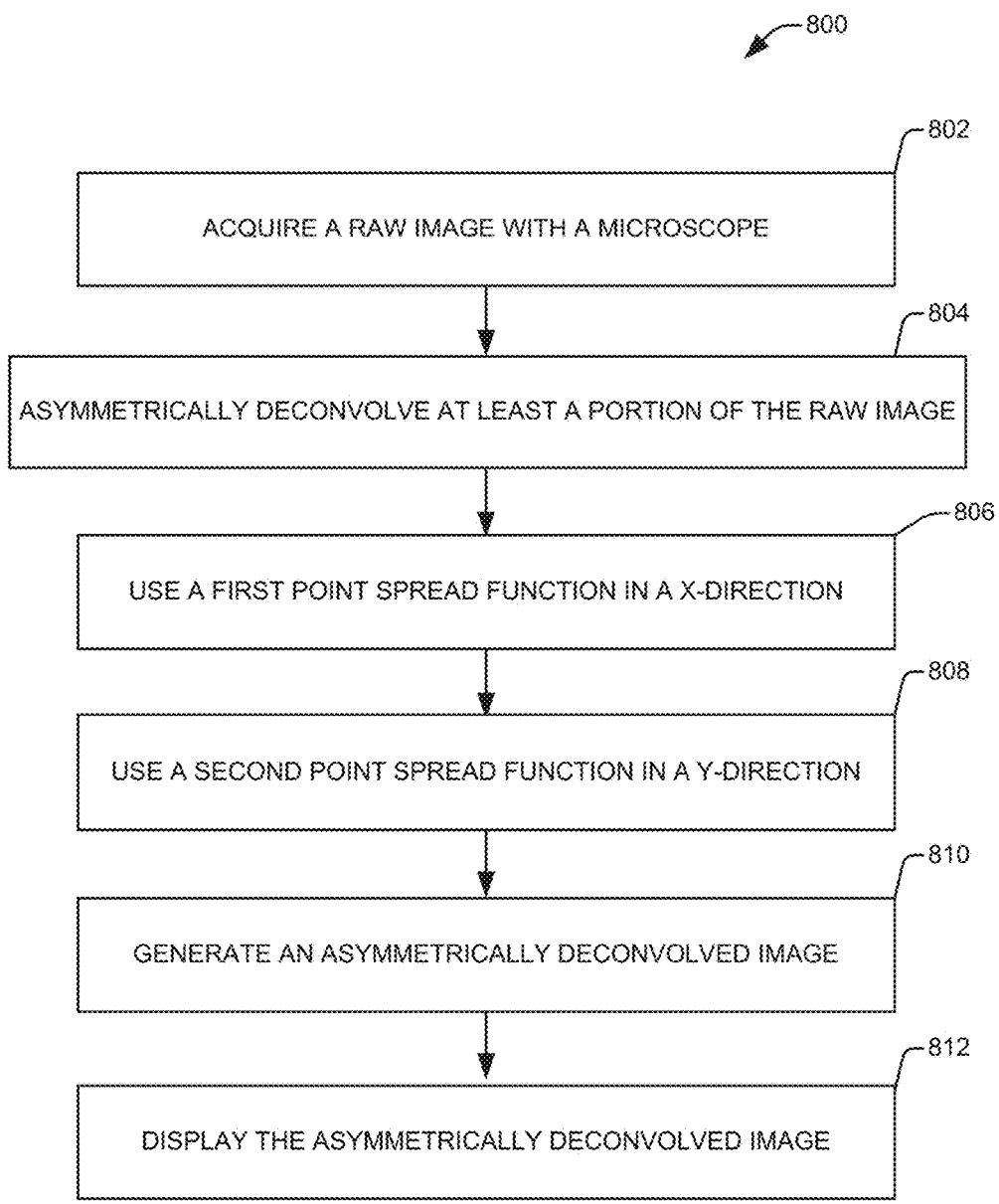
FIG. 8 is an example flow diagram for processing a monochromatic image from a CMOS camera-based line-scan confocal fluorescent microscope in accordance with one or more example embodiments of the present disclosure.

FIG. 8 is an example flow diagram for a method 800 processing a monochromatic image from a CMOS camera-based line-scan confocal fluorescent microscope in accordance with one or more example embodiments of the present disclosure. According to this example embodiment, the X-axis and Y-axis may be deconvolved independently. The X-axis may be deconvolved using a wide-field point-spread function (PSF) and the Y-axis may be deconvolved using a confocal estimate of the PSF. In some embodiments, the X, Y, and Z axes may be treated independently for deconvolution. The communicative property allows for multi-dimensional Fourier transforms to be carried out either simultaneously or piece-wise by dimension, for example, X*Y*Z=XYZ.

In this example embodiment, method 800 may include at block 802 acquiring a raw image with an optical microscope. The raw image may include a monochromatic fluorescent image or just a monochromatic image. The microscope from which the image is acquired may be a line-scan confocal microscope, for example. At block 804, the method may include asymmetrically deconvolving at least a portion of the raw image, according to one or more example embodiments described above. At block 806, the method may include using a first point spread function in a X-direction, and using a second point spread function in a Y-direction at block 808. At block 808, the processor may generate an asymmetrically deconvolved image, and at block 812, the method may include displaying the asymmetrically deconvolved image on a display device. Any of the operations illustrated in FIG. 8 may be executed by the processor 606 and/or input device 604, in the same order as illustrated or in a different order. All of the operations illustrated in FIG. 8 may be stored in one or more non-transitory computer readable media, such as RAM or ROM, which may be accessed and executed by the input device 604 and processor 606.

Other potential features of the asymmetric deconvolution may include directly using the asymmetric PSF or only deconvolving in the one direction. The added photon statistics enabled by additional light throughput benefits live-cell imaging and the added axial contrast significantly enables the deconvolution process to handle more complex 3D samples. The present system can be used with images from various confocal systems including spinning disk confocals, the Olympus DSU confocal, and even some experimental systems by Brad Amos such as the SELS system. This approach is preferable over other confocal systems in that the photon efficiency should be about five times greater than a spinning disk confocal and approximately fifty times greater than a point-scan confocal. Deconvolution can be assessed by comparing conventional wide-field deconvolution on a thin specimen. Confocality can be assessed by comparing the deconvolved line-scan confocal images to images acquired using a point-scan confocal, for example.

Although example embodiments disclosed refer to line-scan confocal microscopes, the present disclosure is not limited as such and the methods and processes described herein may be applied to any microscope, including but not limited to live-cell confocal microscopes, "spinning disk" microscopes, fluorescent microscopes, deconvolution microscopes, point-scan confocal microscopes, and the like. Example methods disclosed improve the photon collection efficiency of the microscope such that the microscopes have a photon collection efficiency of at least 10%, and preferably at least 25% of an equivalent wide-field microscope, compared to the 5% photon efficiency in the existing systems. Example methods described can also improve the speed and viability of the live-cell confocal microscopes.

While there have been shown, described and pointed out, fundamental novel features of the disclosure as applied to the example embodiments, it will be understood that various omissions and substitutions and changes in the form and details of examples illustrated, and in their operation, may be made by those skilled in the art without departing from the spirit of the disclosure. Moreover, it is expressly intended that all combinations of those elements and/or method operations, which perform substantially the same function in substantially the same way to achieve the same results, are within the scope of the disclosure. Moreover, it should be recognized that structures and/or elements and/or method operations shown and/or described in connection with any disclosed form or embodiment of the disclosure may be incorporated in any other disclosed or described or suggested form or embodiment as a general matter of design choice. It is the intention, therefore, to be limited only as indicated by the scope of the claims.

The above description with reference to the accompanying drawings is provided to assist in a comprehensive understanding of certain embodiments of the present disclosure as defined by the claims and their equivalents. It includes various specific details to assist in that understanding but these are to be regarded as merely exemplary. Accordingly, those of ordinary skill in the art will recognize that various changes and modifications of the embodiments may be made without departing from the scope and spirit of the present disclosure. In addition, descriptions of well-known functions and constructions may be omitted for clarity and conciseness.

It is to be understood that the singular forms "a," "an," and "the" include plural referents unless the context clearly dictates otherwise. Thus, for example, reference to "a component surface" includes reference to one or more of such surfaces. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments.

The terms used in the above description and following claims are not limited to their dictionary meanings, but, are merely used to enable a clear and consistent understanding of the present disclosure. Accordingly, it should be apparent to those skilled in the art that the description of embodiments of the present disclosure is provided for illustration purpose only and not for the purpose of limiting the present disclosure as defined by the appended claims and their equivalents.

What is claimed is:

1. A method for processing an image in optical microscopy, the method comprising:
   acquiring a raw image with a microscope, wherein the raw image has an asymmetric resolution that is different in an X direction than in an orthogonal Y direction;
   correcting the raw image using at least one of a X-direction point spread function and a Y-direction point spread function in order to generate an asymmetrically deconvolved image; and
   displaying the asymmetrically deconvolved image on a display device,
   wherein correcting the raw image further comprises:
   determining the X-direction point spread function and applying the X-direction point spread function to deconvolve the X direction; and
   determining the Y-direction point spread function and applying the Y-direction point spread function to deconvolve the Y direction,
   wherein the X-direction and Y-direction are deconvolved independently.

2. The method of claim 1, wherein the raw image has an elliptical point spread function with a confocal point spread function in the Y-direction and a wide field point spread function in the X-direction.

3. The method of claim 2, further comprising:
   determining the elliptical point spread function based at least in part on the wide field point spread function in the X-direction.

4. The method of claim 2, further comprising:
   deconvolving the X-direction using the wide field point spread function; and
   deconvolving the Y-direction using the confocal point spread function.

5. The method of claim 4, wherein the confocal point spread function is a square root of the wide field point spread function.

6. The method of claim 1, wherein a photon collection efficiency of the microscope is at least 10% of an equivalent wide-field microscope.

7. The method of claim 1, wherein the microscope is a line-scan confocal microscope, live-cell confocal microscope, "spinning disk" microscope, fluorescent microscope, deconvolution microscope, or a point-scan confocal microscope.

8. The method of claim 1, wherein the raw image is a monochromatic fluorescent image.

9. The method of claim 1, wherein deconvolving the X-direction or Y-direction comprises Baysian deconvolution, Richardson-Lucy deconvolution, Wiener deconvolution, Fourier deconvolution, wavelets, or other image processing methods that compute deconvolution.

10. The method of claim 1, wherein correcting the raw image further comprises:
    deriving the Y-direction point spread function using the X-direction point spread function; and
    applying the derived Y-direction point spread function to deconvolve the Y-direction.

11. The method of claim 1, wherein the X-direction point spread function is different from the Y-direction point spread function.

12. A system for processing an image in an optical microscopy, the system comprising:
    (a) an input device configured to provide image data from an optical detector; and
    (b) one or more processors coupled to the input device and configured for correcting the image using at least one of a X-direction point spread function and a Y-direction point spread function to generate an asymmetrically deconvolved image,
    wherein correcting the image further comprises:
    determining the X-direction point spread function and applying the X-direction point spread function to deconvolve the X direction; and
    determining the Y-direction point spread function and applying the Y-direction point spread function to deconvolve the Y direction,
    wherein the X-direction and Y-direction are deconvolved independently.

13. The system of claim 12, wherein the one or more processors comprises one or more of a central processing units, a graphics processing unit, and a floating point unit.

14. The system of claim 12, wherein the image comprises a monochromatic fluorescent image with an asymmetric resolution.

15. The system of claim 12, wherein the image comprises an elliptical point spread function with a confocal point spread function in the Y direction and a wide field point spread function in the X direction.

16. The system of claim 15, wherein the one or more processors is further configured to:
    determine the elliptical point spread function based at least in part on the wide field point spread function in the X direction.

17. The system of claim 15, wherein the one or more processors is further configured to:
    deconvolve the X direction using the wide field point spread function; and
    deconvolve the Y direction using the confocal point spread function.

18. The system of claim 15, wherein the confocal point spread function is a square root of the wide field point spread function.

19. The system of claim 12, wherein the input device comprises a line-scan confocal microscope, a live-cell confocal microscope, a "spinning disk" microscope, a fluorescent microscope, a deconvolution microscope, or a point-scan confocal microscope.

20. The system of claim 19, wherein a photon collection efficiency of the microscope is at least 10% of an equivalent wide-field microscope.

21. The system of claim 12, wherein deconvolving the X or Y direction comprises Baysian deconvolution, Richardson-Lucy deconvolution, Wiener deconvolution, Fourier deconvolution, wavelets, or other image processing methods that compute deconvolution.

22. An image processing system for processing a monochromatic image from a CMOS camera-based line-scan confocal fluorescent microscope, the system comprising:
    (a) one or more CMOS cameras capable of generating the monochromatic image; and
    (b) a system for processing the monochromatic image, the system comprising:
    (1) an input device configured to provide image data from the CMOS camera; and
    (2) one or more processors coupled to the input device and configured for:
    correcting the monochromatic image using at least one of a X-direction point spread function and a Y-direction point spread function to generate an asymmetrically deconvolved image, wherein correcting the monochromatic image further comprises:

determining the X-direction point spread function and applying the X-direction point spread function to deconvolve the X direction; and determining the Y-direction point spread function and applying the Y-direction point spread function to deconvolve the Y direction, wherein the X-direction and Y-direction are deconvolved independently.

* * * * *